Jan. 12, 1932.  C. H. VANCE  1,840,683
AIRPLANE STABILIZER
Filed Nov. 9, 1928  2 Sheets-Sheet 1

Inventor
C. H. VANCE.
By Martin P. Smith
Attorney

Jan. 12, 1932. C. H. VANCE 1,840,683
AIRPLANE STABILIZER
Filed Nov. 9, 1928 2 Sheets-Sheet 2
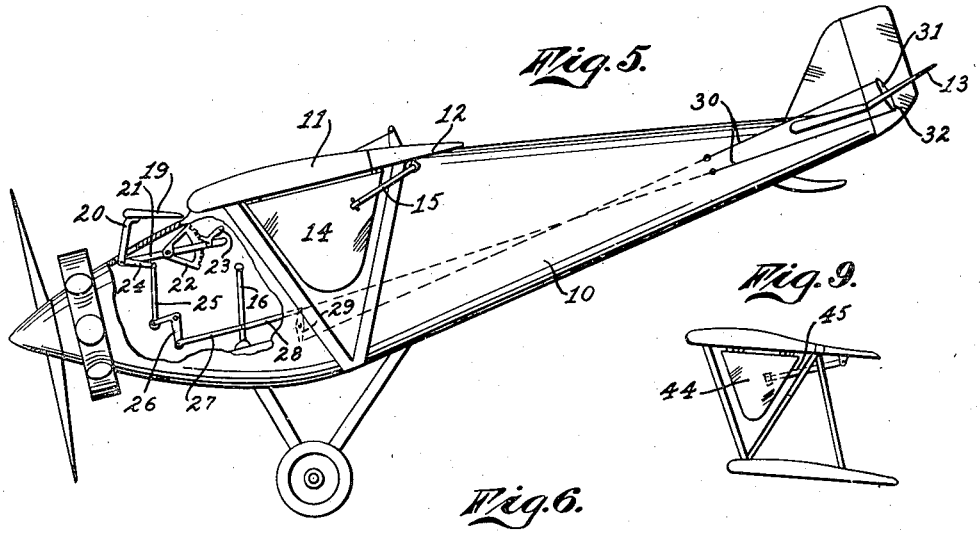
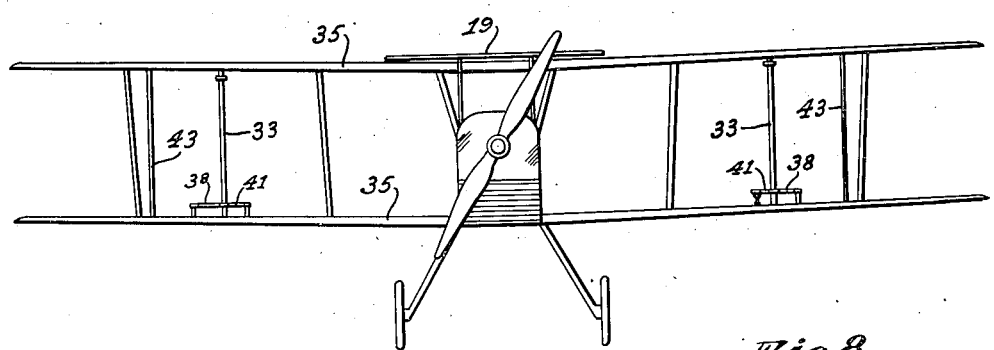
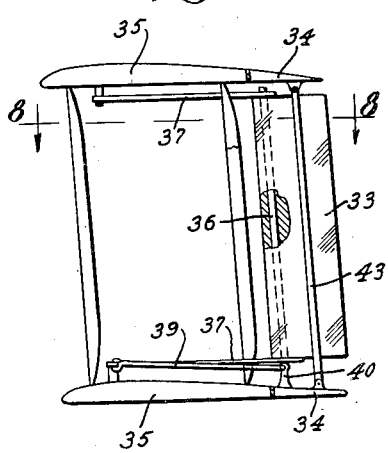
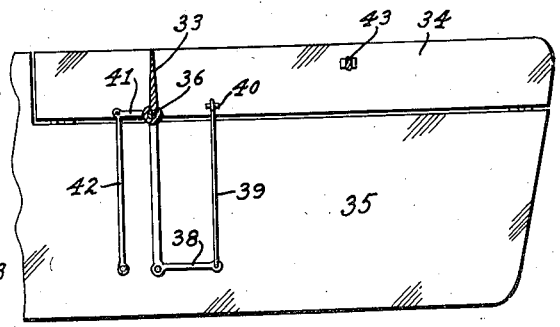

Patented Jan. 12, 1932

1,840,683

UNITED STATES PATENT OFFICE

C. HEBER VANCE, OF ONTARIO, CALIFORNIA

AIRPLANE STABILIZER

Application filed November 9, 1928. Serial No. 318,229.

My invention relates generally to airplanes and more specifically to stabilizing means therefor, and the principal object of my invention is to provide relatively simple, practical and efficient means for controlling the longitudinal and lateral movements of the airplanes while the same are in flight, and which control means is entirely automatic in operation and consequently does not depend for its stabilizing or controlling action upon the pilot of the airplane.

A further object of my invention is to provide an airplane stabilizer or control that does not depend for its operation upon the actuation of weights, pendulums or springs, but which device is actuated by any change in the normal directional flow of air past the airplane while the same is in flight.

A still further object of my invention is to provide an automatic stabilizer or control that may be readily and advantageously applied to practically all standard forms of airplanes and which stabilizing means, in some instances, may be conveniently associated with the standard forms of control levers now in general use on airplanes.

That portion of my invention that is designed for the lateral control of an airship consists of an airfoil or vane positioned on each side of the fuselage and mounted on or near the wings with the leading and trailing edges equidistant from the center line fore and aft through the fuselage and said airfoils or vanes being mounted on bearings having their centers parallel with the center line fore and aft through the fuselage and parallel, or nearly so, with the datum line of the wing, and, further, said airfoils or vanes being mounted so as to move to and from the fuselage and being connected to the aileron in such a manner that movement of the airfoil or vane toward the fuselage will depress the aileron on the same side and raise the aileron on the opposite side.

In some instances it may be found advantageous to mount the airfoils or vanes on parallel levers with bearings arranged vertically or nearly vertical to the datum line of the wing, thereby permitting motion to and from the fuselage with the leading and trailing edges parallel to the center line fore and aft through the fuselage and connected to the ailerons in such a manner that motion of the airfoils toward the fuselage will depress the ailerons on the corresponding or same side and raise the aileron on the opposite side.

The means utilized for longitudinal control consists of an airfoil mounted parallel or nearly so to the leading edge of the wing or bearings that have their centers parallel to the leading edge of the wing, and which bearings are adjusted relative to the wing in order to control the altitude at which the airplane may fly. The center line of bearings is below and forward and parallel to the leading edge of the airfoil and arranged in such manner that the head resistance or drag will tend to rotate the airfoil downwardly and rearwardly and the lift will tend to rotate the airfoil upwardly and forwardly with the result that the airfoil subjected to both forces will automatically move to a central position dividing these forces while the airplane is in flight. This airfoil is connected to the elevators in such a way that when the airfoil rotates backwardly, the elevators will be raised and when the airfoil rotates forwardly, the elevators will be lowered.

With the foregoing and other objects in view, my invention consists in certain novel features of construction and arrangement of parts that will be hereinafter more fully described and claimed and illustrated in the accompanying drawings in which:

Fig. 5 is a side elevational view of a monoplane that is equipped with my improved stabilizing means with parts of the fuselage broken away in order to more clearly illustrate the operating connections.

Fig. 6 is a front elevational view of a biplane that is equipped with my improved stabilizing means.

Fig. 7 is an end view of the wings of a biplane and showing my improved stabilizing means associated therewith.

Fig. 8 is a horizontal section taken on the line 8—8 of Fig. 7.

Fig. 9 is an end elevational view of the wings of the biplane and showing a modified form of the stabilizer applied thereto.

Referring by numerals to the accompanying drawings which illustrate a practical embodiment of my invention, 10 designates the fuselage of a monoplane, 11 the wing that is arranged in the usual manner above the forward position of the fuselage, 12 the ailerons that are hinged in the usual manner to the rear end portions of the wing, and 13 the elevator that is mounted in the usual manner at the rear end of the fuselage.

Arranged on the underside of the wing at points equidistant from the longitudinal axis of the fuselage are airfoils or vanes 14, the upper edges of which are hinged or pivotally connected to the wings, and the axes of said hinges must be parallel with the longitudinal axis of the fuselage.

Each airfoil or vane is connected by a link or rod 15 to the underside of the adjacent aileron 12 and connections between the airfoils and ailerons are such that when the airfoils occupy their normal vertical positions the ailerons 12 occupy their normal horizontal positions. As a result of this arrangement outward swinging movement of the airfoils will cause the ailerons to swing upwardly and inward swinging movement of the airfoils or movement toward the fuselage will swing the ailerons downward.

Obviously, the air stream passing the airplane will, in the event that the plane slips or skids sidewise, impinge upon the inner face of one airfoil and the outer face of the other airfoil with the result that the aileron that is connected to the airfoil that is swung outwardly by air pressure will be elevated and the other aileron will be depressed or swung downwardly by the inward movement of the corresponding airfoil, and which inward movement results from air pressure against its outer face.

Figure 1:
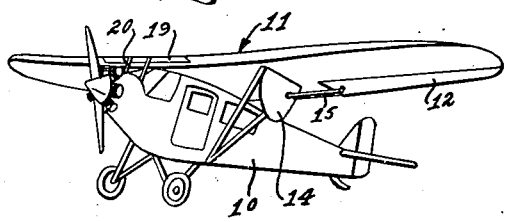
Fig. 1 is a perspective view of a monoplane and showing my improved stabilizing means applied thereto.
Figure 2:
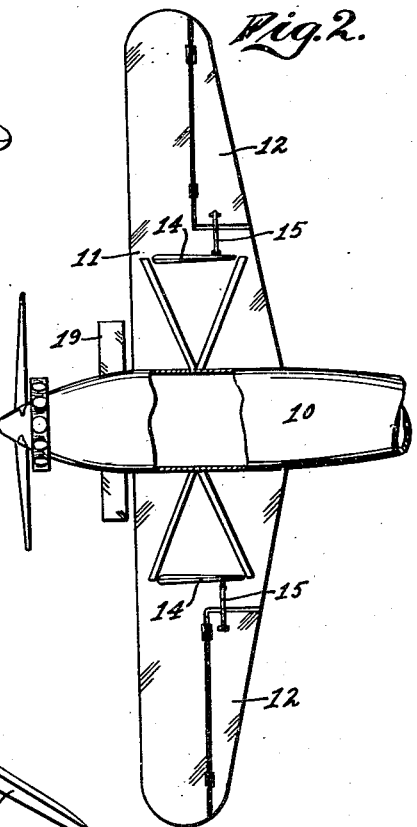
Fig. 2 is a view looking against the underside of the wings of a monoplane that is equipped with the stabilizing means contemplated by my invention.
Figure 3:
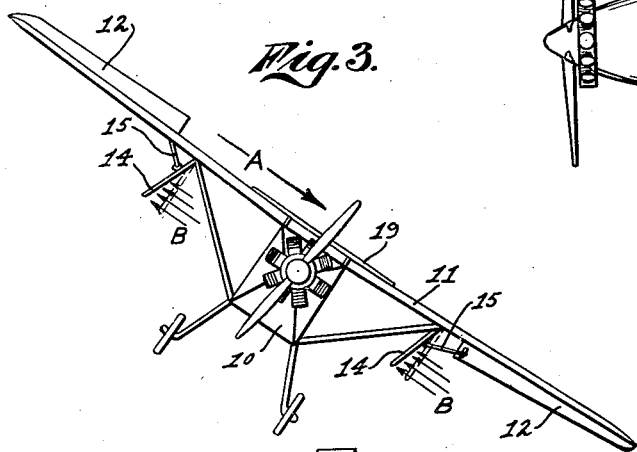
Fig. 3 is a front elevational view of an airplane equipped with the stabilizing means and showing the position of said plane as the same is coming out of a bank.

The condition just described is graphically illustrated in Fig. 3 and where the airplane slips or skids in the direction indicated by the arrow A the air pressure against the airfoils indicated by the arrows B will automatically and simultaneously swing said airfoils so that the aileron at one end of the wing will be elevated while the aileron at the opposite end will be depressed, and under such conditions the pressure or flow of air past the ailerons will tend to right the airplane and counteract lateral skidding or slipping.

Thus my improved arrangement of airfoils connected to the aileron automatically actuates said ailerons in the same manner that they would be moved or shifted manually by the pilot of the airplane.

Figure 4:
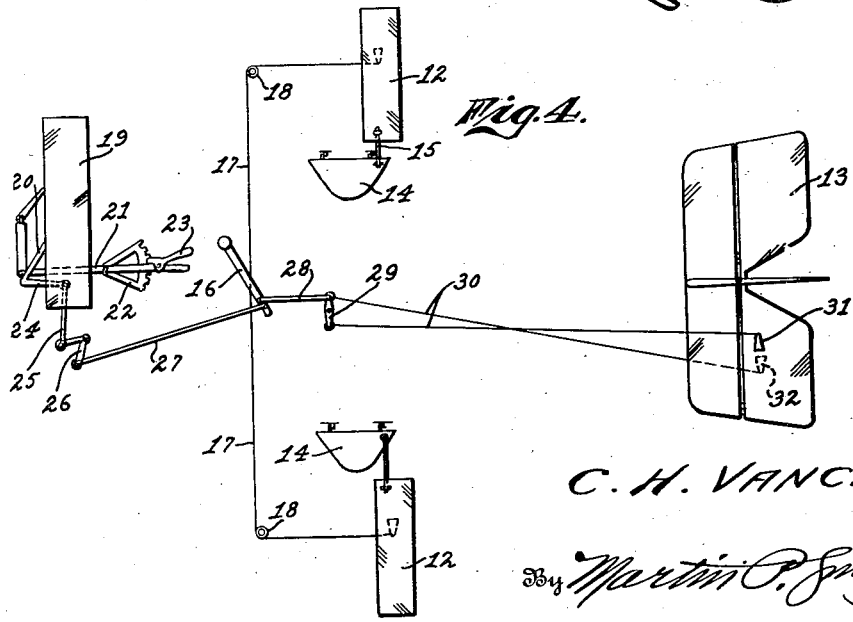
Fig. 4 is a diagrammatic view of my improved stabilizing means and the connections between the same and the ailerons and the elevator.

In Fig. 4, which diagrammatically illustrates the automatic stabilizing means contemplated by my invention, the ailerons 12 are shown connected to the joy-stick 16 by cables 17 which pass around suitably located pulleys 18.

The means utilized for longitudinal control of the airplane while the same is in flight includes a substantially horizontally disposed airfoil 19 that occupies a position in front of the leading edge of the airplane wing 11, said airfoil being supported by a substantially U-shaped frame 20 that depends from the leading edge of said airfoil and the lower cross bar of said frame is pivotally mounted on the forward end of a hand lever 21. This hand lever is fulcrumed intermediate its ends to a segment 22 that is fixed within the forward portion of the fuselage, preferably within the cockpit, and the rear end of the lever is provided with a manually operable latch 23 that engages teeth on the rear arcuate face of the segment.

As a result of this construction hand lever 21 may be swung vertically upon its axis or pivot point, thereby swinging the frame 20 and correspondingly changing the position of the airfoil 19 relative to the fixed position of the wing 11.

Projecting rearwardly from the lower portion of the frame 20 is a short crank arm 24, and the rear end thereof is pivotally connected to a link 25, the lower end of which is pivotally connected to a bell-crank 26. This bell crank is pivoted to a fixed part of the fuselage structure and connecting the lower arm of said bell crank with the lower portion of the joy-stick 16 is a link or rod 27.

Pivotally connected to the lower portion of the joy-stick is the forward end of a rearwardly extending link or rod 28, and the rear end thereof is pivotally connected to the upper end of a short lever 29 that is fulcrumed at its center to a fixed part of the fuselage.

Secured to the ends of the lever 29 are the forward ends of wires or small cables 30 that extend rearwardly through the fuselage, and the wire or cable that is connected to the lower end of the lever 29 has its rear end connected to the upper end of a short arm 31 that projects upwardly from the elevator 13. The wire or cable that is connected to the upper end of lever 29 has its rear end connected to a short arm 32 that projects downwardly from the elevator immediately below the upwardly projecting arm 31.

Under normal conditions or while the airplane is moving forwardly in substantially the same horizontal plane, the force of the air impinging on the upper and lower faces of the airfoil 19, is practically the same, and thus said airfoil automatically assumes a neutral position or a central position between the two impressed or impinging forces, and when so positioned the elevator 13 occupies its normal horizontal position.

Any change in the normal directional flow of the air stream past the airplane is caused by either ascending or descending at too great an angle, which action naturally increases the head resistance upon the airfoil 19 and causing the same to swing on the axis between the frame 20 and the forward end of the hand lever 21, and as a result of this swinging movement on the airfoil, the elevator 13 will be swung upwardly or downwardly as the case may be, so as to act in the usual manner, the same as when manipulated by manual control to bring the plane back to its normal level course.

In the event that the forward end of the airplane tips downwardly the head resistance and increased pressure of the air stream against the upper side of airfoil 19, will cause the same to swing rearwardly and downwardly and, through connections 24, 25, 26, 27 and 28, lever 29 will be swung upon its axis so that through connections 30, 31, and 32, the elevator will be swung upward from its normal position and the impingement of air against the inclined upper surface of said elevator will depress the rear end of the airplane until it assumes its normal forward flight.

In the event that the forward end of the airplane swings upward, then the force of the air stream past the airplane impinging on the underside of airfoil 19 will, through connections to the elevator, cause the same to swing downwardly and the impingement of air against the under inclined face of said elevator will cause the airplane to return to its normal horizontal course.

Thus an automatic actuation of the elevator is effected to control the longitudinal movement of the airplane while the same is in flight and which automatic control is identical with the results attained by manual control or manipulation of the pilot or operator.

The vertical position of the airfoil 19 relative to the leading edge of the wing 11 and the horizontal plane occupied by said wing, may be regulated and controlled by manipulation of the hand lever 21 which carries the frame 20, and which latter supports the airfoil 19, and in addition to moving said airfoil vertically in front of the wing, provision may be made whereby said airfoil may be moved forwardly or rearwardly relative to the airplane wing.

In Figs. 6, 7 and 8 I have illustrated means for controlling the lateral movement of an airplane as applied to a biplane, and where such arrangement is provided vertically disposed airfoils 33 are mounted for lateral swinging movement between the ailerons 34 that are mounted in the usual manner on the rear portions of the wings 35 adjacent to their outer ends. Each airfoil 33 is pivotally mounted on a substantially upright rod 36 and the ends of each rod are supported by horizontally disposed arms 37 that are hinged adjacent to the wings 35.

The forward ends of rod 37 are pivotally connected to the wings 35 and projecting at right angles from the lower one of each pair of rods is a short arm 38 to the outer end of which is pivotally connected the forward end of a link 39 and the rear end of the latter is pivotally connected to a short post 40 that projects upwardly from the lower one of the ailerons 34 at a point near its longitudinal center.

Fixed to and projecting inwardly from the lower portion of each airfoil 33 is a short arm 41 and pivotally connected thereto is the rear end of a link or rod 42, the forward end of which is pivotally connected to the lower wing 35 in transverse alinement with the pivot point of the lower arm 37. The lower arms 37 and 42 are parallel with each other and as a result of such arrangement airfoils 33 always maintain a plane approximately at right angles to the front and rear edges of the wing between which the ailerons are positioned.

The members of each pair of ailerons 34 are connected by a vertically disposed rod or link 43, the ends thereof being pivotally connected to said ailerons, thus providing for simultaneous and synchronous movement of said ailerons.

Under normal conditions the airfoils 33 occupy neutral positions while the airplane is in flight, and when so positioned the ailerons 34 occupy their normal or neutral positions in line with the wings 35.

In the event that the airplane tends to slip sidewise during forward movement the increased pressure of the air flow past the ailerons will tend to move said ailerons into normal positions and as a result of such action the arms 27 will be swung upon their axes and through connections 38, 39 and 40, the ailerons 34 will be correspondingly moved, one moving upwardly and the other downwardly, or vice versa, as the case may be, thus tending to right the machine and bring the same back to its normal or true course.

In Fig. 9 I have shown an airfoil 44 hinged to the underside of the upper wing of a biplane, and connected to the ailerons of said upper wing by a link 45 and as a result of such construction, the aileron to which the airfoil is connected will be correspondingly raised or lowered as the airfoil swings laterally from its normal position parallel with the axis of the body or fuselage of the airplane.

Thus it will be seen that I have provided relatively simple, practical and efficient means that is entirely automatic in its action and which controls the lateral and longitudinal movements of the airplane while the same is in free flight.

My improved control mechanism may be applied to any standard form of airplane, does not require attention or manipulation by the pilot or operator of the airplane, and said means is actuated by any change in the normal directional flow of air past the plane without the use of extraneous actuating means such as weights, pendulum, springs or the like.

If for any cause, such as side slipping or improper operation of the manual controls of the airplane, there is any change in the direction of the normal air flow past the airplane, the pressure brought to bear on the outside of the airfoil toward which the airplane is slipping, will effect a depression of the aileron on that side of the airplane in proportion to the amount of directional change in the airflow, with the result that the airplane will be brought back to its normal position while in flight.

My improved control does not interfere in any way with the normal operation of the airplane and it is particularly effective and advantageous in maintaining normal flight of the plane through fog or clouds where the pilot or operator ordinarily losses his bearings.

A plane equipped with the longitudinal control operating at a given speed will maintain a fairly definite predetermined altitude, which result is possible due to the fact that the greater altitude at which the airplane flies at a given speed, the greater becomes its angle of attack in order to support its weight.

An airplane equipped with my improved lateral and longitudinal controls has an added factor of safety for the equipped plane with no motor power, or with the engines shut off, will enable the plane to traverse a normal glinding angle in alighting on the ground or water.

It will be understood that minor changes in the size, form and construction of the various parts of my improved airplane stabilizer may be made and substituted for those herein shown and described without departing from the spirit of my invention, the scope of which is set forth in the appended claims.

I claim as my invention:

1. The combination with an airplane, its wing and ailerons, the latter having horizontal axes disposed substantially at right angles to the axis of the fuselage, of vertically disposed parallel airfoils hinged with horizontal axes to the airplane wing on opposite sides of the airplane fuselage, with the leading and trailing edges of said airfoils equidistant from the longitudinal axis of the fuselage and adapted to swing toward and away from said fuselage, and connections from said airfoils to the ailerons.

2. The combination with an airplane, its wings and ailerons, the latter having horizontal axes disposed substantially at right angles to the axis of the fuselage, of airfoils hinged on the underside of the wing on opposite sides of the airplane fuselage with parallel horizontally disposed axes, so as to swing toward and away from said fuselage, which airfoils normally occupy planes substantially parallel with the fuselage and connections between said airfoils and ailerons, whereby the latter are swung vertically as the airfoils swing laterally from their normal positions.

3. The combination, with an airplane, its wings and ailerons, the latter having axes disposed substantially at right angles to the axis of the fuselage, of vertically disposed parallel airfoils mounted for swinging movement on the airplane wing on opposite sides of the fuselage of the airplane with horizontally disposed parallel axes and connected to the ailerons so that simultaneous increased air pressure or corresponding faces of the airfoils will simultaneously move the ailerons in opposite directions.

4. The combination with an airplane, its wing and elevator, of an airfoil mounted for vertical swinging movement in front of the airplane wing manually operable means for shifting the vertical position of said airfoil relative to the entering edge of the air plane wing and for securing said airfoil in its vertically adjusted position, and connections between said airfoil and the elevator whereby resulting from a change in position of the airfoil is transmitted to the elevator.

5. The combination with an airplane, its wing and elevator, of an airfoil adjustably supported in front of the airplane wing and adapted to swing through a vertical arc, manually operable means for shifting the vertical position of said airfoil relative to the entering edge of the airplane wing and for securing said airfoil in its vertically adjusted position, and connections from said airfoils to the elevator of the airplane, whereby the latter is swung upwardly or downwardly corresponding to the swinging movement imparted to the airfoil by increased air pressure on its upper or lower surfaces.

6. The combination with an airplane, its wing and elevator, of an airfoil mounted for swinging movement in front of the airplane, manually operable means for adjusting the position of said airfoil relative to the front edge of the wing and for securing said airfoil in its vertically adjusted position, and connections from said airfoil to the elevator whereby the latter is partially rotated as the airfoil changes position due to increased air pressure on its upper or lower surfaces.

7. The combination with an airplane, and its elevator, of a vertically adjustable shaft arranged in front of the airplane wing, a frame carried by said shaft, an airfoil mounted on said frame and disposed in front of the entering edge of the wing and connections from said shaft to the elevator whereby the latter is automatically shifted as the airfoil is moved by any change in the normal directional flow of air past the airplane while the same is in flight.

8. The combination with an airplane, its wing and ailerons, which latter are hinged to the rear portion of the wing on axes that are disposed substantially at right angles to the longitudinal axis of the airplane fuselage, of vertically disposed air foils hinged to the airplane wing immediately adjacent to said ailerons, the axes of swinging movement of said air foils being disposed at right angles to the axis of swinging movement of the ailerons and connections between said air foils and ailerons whereby the latter are automatically actuated as the air foils are moved by any change in the normal directional flow of air past the airplane while the same is in flight.

9. The combination with an airplane, its wing and ailerons, the latter having horizontal axes disposed substantially at right angles to the axis of the fuselage, of vertically disposed airfoils connected to the airplane wing by horizontally disposed bearings that are parallel with the axis of the fuselage and connections between said airfoils and the ailerons whereby the latter are swung vertically as a result of lateral swinging movement of said airfoils.

10. The combination with an airplane, its wing and ailerons, the axes of the bearings of which ailerons are horizontally disposed and arranged substantially at right angles to the axis of the fuselage, of vertically disposed airfoils connected to the airplane wing on opposite sides of the fuselage by horizontally disposed bearings that are substantially parallel with the axis of the fuselage, connections between said airfoils and the ailerons whereby the latter are swung vertically as a result of the lateral swinging movement of said airfoils, a pivoted hand lever and connections from said hand lever to ailerons whereby the same are simultaneously and correspondingly swung upon their bearings.

11. The combination with an airplane, its wing and ailerons, the axes of the bearings for said ailerons being horizontally disposed and arranged at right angles to the axis of the fuselage, of vertically disposed airfoils mounted on horizontally disposed bearings that are substantially parallel to the axis of the fuselage, connections between said airfoils and ailerons whereby the latter are automatically and simultaneously swung in opposite directions as a result of increased air pressure on corresponding faces of the airfoils, and manually operable means for simultaneously swinging said ailerons upon their bearings.

In testimony whereof I affix my signature.
C. HEBER VANCE.